United States Patent
Fleury et al.

[15] 3,673,072
[45] June 27, 1972

[54] AUTOMATIC REGULATION OF ELECTROCHEMICAL MACHINING SYSTEMS

[72] Inventors: Jean Fleury; Jean Pinot, both of Billancourt, France

[73] Assignees: Regie Nationale Des Usines Renaults, Billancourt; Automobiles Peugeot, Paris, France

[22] Filed: Feb. 16, 1971

[21] Appl. No.: 115,426

[30] Foreign Application Priority Data

Feb. 18, 1970    France..................................7005750

[52] U.S. Cl............................................204/224, 204/229
[51] Int. Cl. ........................................B23p 1/02, B01k 3/04
[58] Field of Search ...................204/224, 225, 229, 143 M

[56] References Cited

UNITED STATES PATENTS 3,440,156    4/1969    Dickson..............................204/224 X
3,616,433    10/1971   Williams...............................204/224

FOREIGN PATENTS OR APPLICATIONS

38/12,829    7/1963    Japan....................................204/224
38/13,764    7/1963    Japan....................................204/224
41/18,487    10/1966   Japan..................................204/143 M Primary Examiner—John H. Mack
Assistant Examiner—D. R. Valentine
Attorney—Stevens, Davis, Miller & Mosher

[57] ABSTRACT

This device for the automatic regulation of electrochemical machining processes is adapted to modify machining conditions according to the nature of the surface being machined and the rate of tool feed. It comprises temperature measuring means inserted in each electrolyte discharge conduit and adapted to control through servo means the output adjustment members. This device is applicable to the regulation of machining conditions by varying the return electrolyte output in machines of the type comprising an electrolyte-filled chamber under pressure.

7 Claims, 1 Drawing Figure

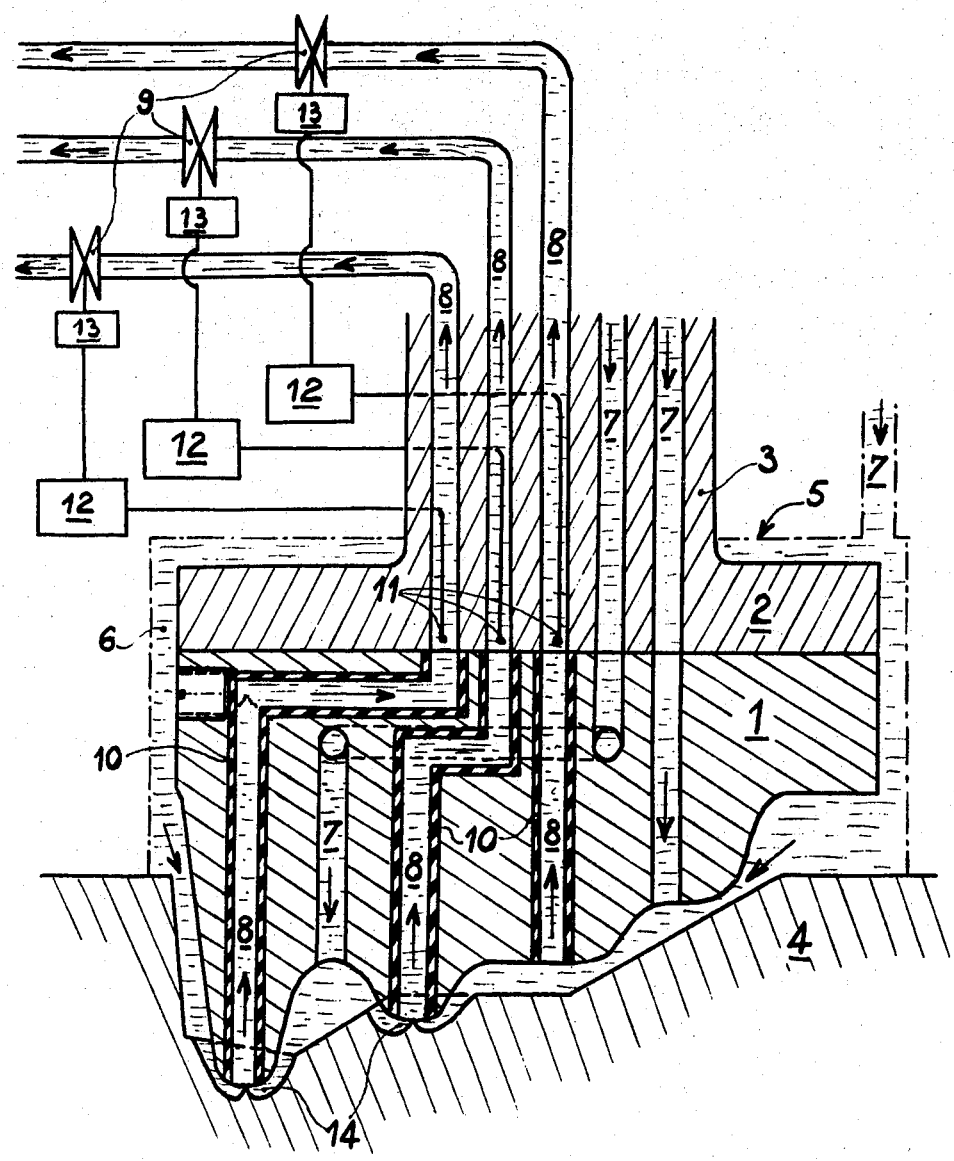

AUTOMATIC REGULATION OF ELECTROCHEMICAL MACHINING SYSTEMS

The present invention relates to means for automatically regulating the operating conditions of an electrode-tool in an electrochemical machining process.

In machines designed for electrochemical machining processes the workpiece material is removed electrolytically by causing a unidirectional electric current to flow between an anode-workpiece and a cathode-tool across an electrolyte circulating in the space provided between workpiece and tool.

The precision and reproducibility of an electrochemical machining operation are subordinate to the stability of operating conditions prevailing in the space left between workpiece and tool. Therefore, these conditions vary as a function of the evolution of the geometry of the machined surface and also of the physical changes occurring in the electrolyte proper, i.e. either an output reduction and a increment both in temperature and the electrolyte iron hydroxide contents as a function of the increment in the surface areas involved (loss of pressure).

The parameters controlling the values of the machining gap are the voltage applied to the tool and workpiece, the tool feed rate and the electrolyte current conductivity.

The first two parameters are generally kept at constant values or at least easily adjusted. It has been endeavoured to keep the conductivity of the electrolyte at a constant value by stabilizing its temperature and possibly modifying this temperature as a function of composition variations. Arrangements of this character comprise means for directly measuring the conductivity in conjunction with a temperature regulating device responsive to the apparatus provided for measuring the electrolyte conductivity and the electrolyte concentration.

As a result, these installations are both sophisticated and very expensive, and this temperature regulation method is attended by a certain response inertia or lag.

Arrangements are also known wherein the machining rate is adjusted by varying the electrolyte output at different points of the machined surface. The output evolution is adjusted in this case as a function of a predetermined program. However, also in this arrangement the program is costly to develop and achieve, and the versatility and flexibility of operation is rather questionable.

The present invention is directed to means capable of achieving an output regulation as a function of the evolution of the machined surfaced by controlling directly the electrolyte temperature.

It is therefore the essential object of the present invention to provide a device for regulating the electrolyte output in the specific case of the machining of workpieces in a pressurized chamber comprising means for measuring the temperature in each return duct for the electrolyte flow, said means controlling in turn the output adjustment members corresponding to each return duct.

Another object of this invention consists in arranging said temperature measuring means in the workpiece carrier tray and coating the inner walls of the electrolyte return ducts with a suitable head-insulating material between the machining area and the point where the temperature is measured.

Provided only that the losses of pressure in the machining area at the inlet of each electrolyte return duct remain constantly inferior to those of the corresponding output adjustment valve, the present invention will thus constitute an automatic machining regulating system. When the electrolyte temperature rises as a consequence of a reduction in electrolyte output due to the increase in the machined surface area, the temperature measuring means determines an increase in the cross-sectional passage area of the output adjustment valve. Thus, the increased electrolyte output restores the temperature to its initial value and the state of equilibrium controlling the amount of electrolyte per surface unit is also restored to its initial value.

In addition to its considerable simplicity, the arrangement according to the present invention is advantageous in that it achieves a continuous regulation of the machining process without requiring any preliminary work programming procedure, thus affording a considerable simplification in the general arrangement of the machine and a greater flexibility for adapting same to the most diversified types of machining operations, since only the tools are to be changed. The range of working temperatures contemplated for the electrolyte will determine automatically the electrolyte output adjustment at different points of the surface to be machined.

A typical and exemplary form of embodiment of a device constructed according to the teachings of this invention will now be described with reference to the attached drawing of which the single FIGURE illustrates diagrammatically in section an electrode-tool assembly during a machining operation.

A cathode-tool 1 is secured to an electrode carrier tray 2 rigid with a guiding column 3. In the figure the tool 1 is shown in its position of engagement at the beginning of a machining operation to be performed on a workpiece 4. The pressure chamber is shown diagrammatically by a chain-dotted line 5.

The electrolyte 6 is supplied under pressure to chamber 5 via inlet ducts 7 opening either directly into said pressure chamber 5 or through column 3 and tray 2, and through the tool 1, into preferential areas of the tool surface.

The electrolyte is discharged or returned through ducts 8 opening likewise into the tool surface in preferential machining areas, so as to rise through the tool 1 and tray 2 along column 3. These ducts 8 are continued by pipe-lines receiving output regulating valves 9 to the apparatus for recovering and regenerating the electrolyte (by regulation and cleaning, etc.) not shown, from which the electrolyte is recycled through the tool 1 via ducts 7.

In the area corresponding to the passage through the tool 1 the inner walls of ducts 8 are coated with a lining 10 of heat-insulating material. This lining may consist of a layer of plastic material applied by immersion or any other equivalent method. Alternatively, sections of plastic tubes may be driven through corresponding holes formed through the tool means.

Thermocouples 11 are disposed within the ducts 8 and their ends are flush with the surface of the tool-supporting tray 2, the ends of the ducts 8 of tool 1 being head-insulated. These thermocouples are connected to regulating amplifiers 12 controlling through servo-relays 13 the degree of opening of the output adjustment valves 9.

During the operation, when the temperature of the electrolyte rises, for example in the machining areas 14, this temperature increment is transmitted without any appreciable variation, due to the heat-insulating lining 10, to the thermocouples 11 controlling the regulating amplifiers 12. When the temperature exceeds a predetermined or preset maximum or limit value, the amplifiers 12 control via servo-relays 13 the opening of output regulating valves 9. The resulting increment in the electrolyte output is attended by the return to the selected initial temperature value, thus restoring the equilibrium corresponding to the proper amount of electrolyte per surface unit. Under these conditions, it is clear that for a given tool feed rate a self-regulation of the machining conditions will be achieved by adjusting the electrolyte output in the different areas as a function of the detected variations in the local temperature.

An output (the same in each return duct 8), though low it may be, is always necessary for providing a reference datum to regulating device. The output increment in each duct 8 varies without any interference from one duct to another and only as a function of the local evolution of the machined surfaces.

The provision of thermocouples 11 within the tray 2, well recessed from the tool means 2, affords a rapid and easy replacement of these tool means without any risk of damaging the thermocouples since these are not handled during this tool substitution.

Although a single form of embodiment has been described hereinabove with reference to the attached drawing, it will readily occur to those conversant with the art that various modifications may be brought thereto without departing from the spirit and scope of the invention as set forth in the appended claims.

What is claimed as new is:

1. Device for automatically regulating the electrochemical machining of workpieces in machines wherein the tool operated within a pressurized chamber filled with electrolyte, said tool comprising duct means for supplying and discharging the electrolyte, characterized in that temperature measuring means are inserted in each electrolyte discharge duct and adapted to control through servo means electrolyte adjustment means inserted in the corresponding discharge ducts.

2. Automatic regulating device according to claim 1, wherein the temperature measuring means consist of thermocouples disposed within the electrolyte discharge ducts.

3. Automatic regulating device according to claims 1 and 2, wherein the points where the electrolyte temperature is measured are located within a tool-carrier tray at the level of the tool mounting surface.

4. Automatic regulating device according to claim 3, wherein the electrolyte discharge ducts extend through said tool and have heat-insulated inner walls.

5. Automatic regulating device according to claim 4, wherein the heat insulation of the inner walls of said electrolyte discharge ducts consists of a plastic coating applied by immersion.

6. Automatic regulating device according to claim 4, wherein said heat insulation consists of plastic tube sections inserted in the corresponding holes formed in the tool means for constituting said electrolyte discharge ducts.

7. Automatic regulating device according to claim 1, wherein the output adjustment means consist of solenoid-operated valves and said servo-means comprise a regulating-amplifier and a servo-relay.

* * * * *